Oct. 21, 1930. C. A. TOWNE 1,778,968
COMBINATION ROD AND TUBING FISHING TOOL
Filed Nov. 20, 1929
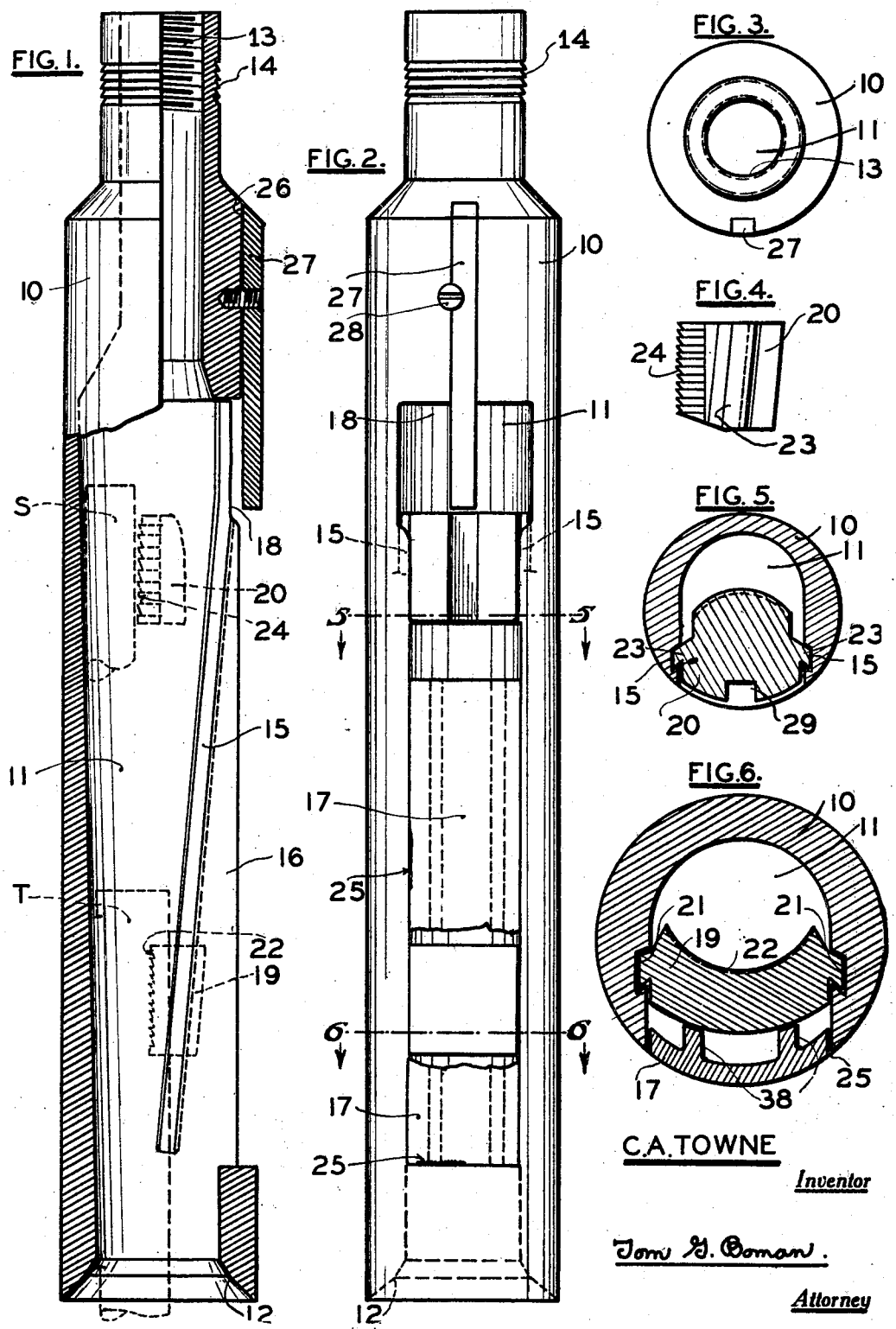
C. A. TOWNE
Inventor
Tom G. Boman.
Attorney Patented Oct. 21, 1930

1,778,968

UNITED STATES PATENT OFFICE

CHARLES A. TOWNE, OF TULSA, OKLAHOMA

COMBINATION ROD AND TUBING FISHING TOOL

Application filed November 20, 1929. Serial No. 408,586.

My invention relates to oil field equipment and more particularly to a combination fishing tool. That is to say, a fishing tool which is capable of retrieving either tubing or sucker rods.

I appreciate that it is old to combine gripping devices in a single tool so as to perform the aforesaid results, as shown by the patent to Clulow, #1,491,463, entitled "Fishing tool", dated April 22, 1924, and hence it is my desire to claim only my improved and simplified construction.

One of the main features of my fishing device is its strength and sturdiness due to its one piece body construction. Previous to my device it has been the practice to form the body member of tools of this character out of several parts which is objectionable due to the ever present danger of the separation of the body when under working conditions. However, previously, it had been thought necessary to have the body member in several parts in order to properly machine it but I have discovered that all machining may be accomplished from or through an opening along the side of the tool. Hence, I am able to maintain an integral ring of virgin metal entirely around the operating end of the tool. The strength of the body is further increased by welding a plate into the side opening. This plate is of such size as to substantially close the opening.

The side plate not only strengthens the body member but also provides a means for transmitting part or perhaps all of the strains due to the action of the grippers to the body member. In other words the plate "backs up" the grippers.

Grooves are cut along the interior of the body member and serve to guide the lugs on the gripping devices. The grooves are undercut and the lugs tapered to fit therein and hence no separation can occur unless the lugs should be sheared off. And, obviously, this is unlikely as the plate takes the strain on the grippers rather than the lugs. In this connection it might be well to point out a minor point. When the grippers are pushed back toward the plate, due to their gripping action upon a "lost" object, the lugs, being tapered, tend to creep back in the undercut grooves and in so doing tend to pull in the walls of the body. This is somewhat advantageous as the plate, although practically integral with the body, nevertheless is able to withstand compression thereon better than tension.

Another advantage which I obtain is due to the manner in which the gripping devices are inserted and held from removal. By enlarging the side opening near its top I provide for the insertion of the gripping devices. Gravity causes them to usually remain at the bottom of the tool and hence there is no danger of losing them. When the tool is in operation the grippers may slide up and down and I prevent their egress by fastening a short bar-like member or key to the body member so as to protrude across the enlargement of the side opening.

Other objects of this invention will be set forth in the following description and drawing which illustrates a preferred embodiment of this invention, it being understood that the above general statement is extended merely to generally explain the same and not to limit it in any manner.

In the drawing

Figure 1 is a vertical section through the preferred form of my fishing tool.

Figure 2 is an elevation of my fishing tool with part of the plate broken away in order to clarify the showing.

Figure 3 is a top view of the fishing device.

Figure 4 is a side view of the convex gripper or gripping device.

Figure 5 is a view in cross section taken along the line 5—5 of Figure 2.

Figure 6 is an enlarged cross sectional view taken along the line 6—6 of Figure 2.

Referring now to the drawings in detail 10 designates the body or integral, elongated, cylindrical socket member which has a bore or chamber 11 and is doubly flared as at 12. The body 10 has an upper neck which is hollow and threaded as at 13. The exterior of this neck is provided with ridges or knurls 14 which provide for gripping the same by a fishing tool in case the same should become "lost".

It will be noted that the bore or chamber 11 extends at an angle to the axis of the tool and this provides for gripping slightly larger objects as well as binding them more tightly when the tool is withdrawn from the well.

A pair of undercut grooves or channels 15 are formed in the wall defining the bore 11 and diverge upwardly and finally pass outwardly through the opening 18 as clearly shown in Figure 1.

A concave gripping device 19, see Figure 6, has lugs 21 formed integrally therewith and slidably rides in the undercut grooves or channels 15. The lugs 21 correspond in shape to the grooves in which they ride and hence prevent separation of the walls of the body member 10. The gripper 19 has teeth 22 on its front portion and as the gripper moves upwardly and downwardly these teeth remain about parallel to the juxtaposed wall of the socket member but recede and approach with respect thereto.

A convex gripping device 20 has lugs 23 and a number of gripping teeth 24. A squared slot 29 is cut in its back portion. This gripping device acts similarly to the other one. That is, as the gripper travels downwardly it approaches the wall facing it and grips any object which may come therebetween. The lower gripping device, being concave, is adapted for tubing and larger objects whereas the convex gripper is for sucker rods and the like.

As shown in Figures 1, 2 and 3 a bar-like member or key 27 is held in a slot 26, formed in the body 10, by means of a screw 28. This key is detachable and must be removed when the gripping devices are inserted or removed from the fishing tool. When it is in place the upper or convex gripper may slide upwardly without any interference therefrom since the squared slot 29 is in alignment with the key 27.

A plate 17, with ribs 38, see Figures 2 and 6, is welded so as to close the lower part of the side opening 16. This weld is preferably formed electrically and is indicated by the numeral 25. The ribs 38 contact with and hence support the sliding gripping members. The reinforcing plate precludes any spreading of the body member. Thus the gripping members or devices will always freely slide and properly function. The side opening 16 is enlarged slightly as at 18 so as to allow the gripping devices to be freely inserted and withdrawn.

In Figure 1 gripping devices 19 and 20 are shown in dotted lines. The upper gripper holds the rod S and the lower gripper holds the tubing T.

Although a particular embodiment of the invention has been illustrated and described in order to comply with the terms of the patent statutes, it is not intended that the invention shall be limited to said particular embodiment since the invention may be applied to other forms without departing from its spirit.

What I claim is:

1. A fishing tool consisting of an integral, cylindrical, elongated, open-sided socket member having ridges near its upper end and having a bore therethrough, said bore being doubly flared at its lower end, interiorly threaded at its upper end and connecting with the aforesaid side opening, undercut grooves formed in the walls defining said bore and extending in upwardly diverging relationship to the axis of said bore until they emerge through the open side of the socket member, a gripping device having lugs thereon adapted to be inserted into the undercut grooves and detachable means adapted to be fastened to the socket member to prevent egress of the gripping device.

2. A fishing tool comprising a member having a chamber opening into the side and also into the bottom of the member, two of the walls defining said chamber having opposed undercut grooves formed therein, said grooves extending from the side opening downwardly, and a gripping device held and guided by said grooves and having a surface cooperating with one side of said chamber to clamp a tube or rod therein.

3. A fishing tool comprising a socket having a longitudinal bore, said bore opening through the side of the socket, a plurality of gripping devices slidably arranged within said bore and a member detachably secured to the socket to prevent egress of the gripping devices.

4. In a fishing tool comprised of an open sided hollow socket member with a gripping device adapted for limited movement therein, the combination of means rigidly fastened to the sides of the socket and partly closing the open side thereof to prevent spreading thereof.

5. In a fishing tool comprised of an open sided hollow socket member with grooves therein and a gripping device mounted in said grooves, the combination of a plate adapted to be fastened in said open side and contact with the gripping device.

6. A fishing tool having an elongated body with a bore at its lower end, said bore opening at the side of said body, a gripping device adapted to be inserted through the aforesaid side opening and guiding means on either side of said gripping device adapted to be cooperably associated with opposed walls of the said bore.

7. A fishing tool of the character described comprising an elongated integral body member having a bore extending upwardly from its bottom and through its side, gripping means slidably mounted within said bore, and plate means partly closing the side opening and adapted to abut the gripping means.

In testimony whereof I affix my signature.

CHARLES A. TOWNE.